United States Patent
Box et al.

(10) Patent No.: US 8,276,165 B2
(45) Date of Patent: Sep. 25, 2012

(54) CONTINUATION-BASED RUNTIME CALLBACK INVOCATION

(75) Inventors: Donald F. Box, Bellevue, WA (US); Geoffrey M. Kizer, Seattle, WA (US); Kenneth David Wolf, Seattle, WA (US); Jeffrey C. Schlimmer, Redmond, WA (US); Edmund Samuel Victor Pinto, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1154 days.

(21) Appl. No.: 12/129,594

(22) Filed: May 29, 2008

(65) Prior Publication Data

US 2009/0300648 A1    Dec. 3, 2009

(51) Int. Cl.
  *G06F 9/44*    (2006.01)
  *G06Q 10/00*   (2012.01)
(52) U.S. Cl. ............................ 719/328; 705/12; 717/100
(58) Field of Classification Search .................... 705/12; 717/100; 719/328
  See application file for complete search history.

(56) References Cited

U.S. PATENT DOCUMENTS

| | | | |
|---|---|---|---|
| 5,628,017 A | 5/1997 | Kimmerly et al. | |
| 5,822,585 A | 10/1998 | Noble et al. | |
| 5,901,315 A | 5/1999 | Edwards et al. | |
| 6,192,512 B1 | 2/2001 | Chess | |
| 6,721,809 B1 | 4/2004 | Roy et al. | |
| 6,810,523 B2 | 10/2004 | Segev et al. | |
| 7,003,782 B2 | 2/2006 | Baldwin et al. | |
| 7,076,784 B1 | 7/2006 | Russell et al. | |
| 7,716,278 B2 * | 5/2010 | Beringer et al. | 709/203 |
| 8,082,544 B2 * | 12/2011 | Inchingolo et al. | 718/100 |
| 2005/0097578 A1 | 5/2005 | Rangarajan | |
| 2005/0149868 A1 * | 7/2005 | Katayama et al. | 715/700 |
| 2007/0050227 A1 * | 3/2007 | Teegan et al. | 705/8 |

OTHER PUBLICATIONS

Parameterized Modules in Erlang—2003 (7 pages) http://www.erlang.se/workshop/2003/paper/p29-carlsson.pdf.
Developing Mobile Applications with the Compact Framework 2.0—Jul. 17, 2007 (41 pages) http://blogs.msdn.com/trobbins/archive/2007/07/17/developing-mobile-applications-with-the-compact-framework-2-0.aspx.
Creating and Executing Callback Functions (4 pages) http://www.mathworks.com/access/helpdesk/help/toolbox/opc/index.html?/access/helpdesk/help/toolbox/opc/ug/f3-119409.html&http://www.google.co.in/search?hl=en&q=+%22executing+callback%22&meta=.

* cited by examiner

*Primary Examiner* — Charles E Anya
(74) *Attorney, Agent, or Firm* — Workman Nydegger

(57) ABSTRACT

Activity callbacks in a continuation-based runtime. At framework-definition time, a framework activity is authored. The framework activity may have an environmental logic portion the processes input or output parameters whose values will be supplied to and/or received from an activity callback. The framework activity also includes a callback invocation portion that, during execution time, will actually provide parameter value(s) to and/or receive parameter value(s) from the activity callback. The framework activity serves as a framework that operates with any activity callback that has one or more characteristics. Such activity callbacks may not even be defined at framework-definition time. Instead, the framework activity may be used multiple times in the same applications, or in different applications to thereby provide core framework functionality, while allowing application developers to plug in activity callbacks that meet the custom needs of the application.

16 Claims, 4 Drawing Sheets

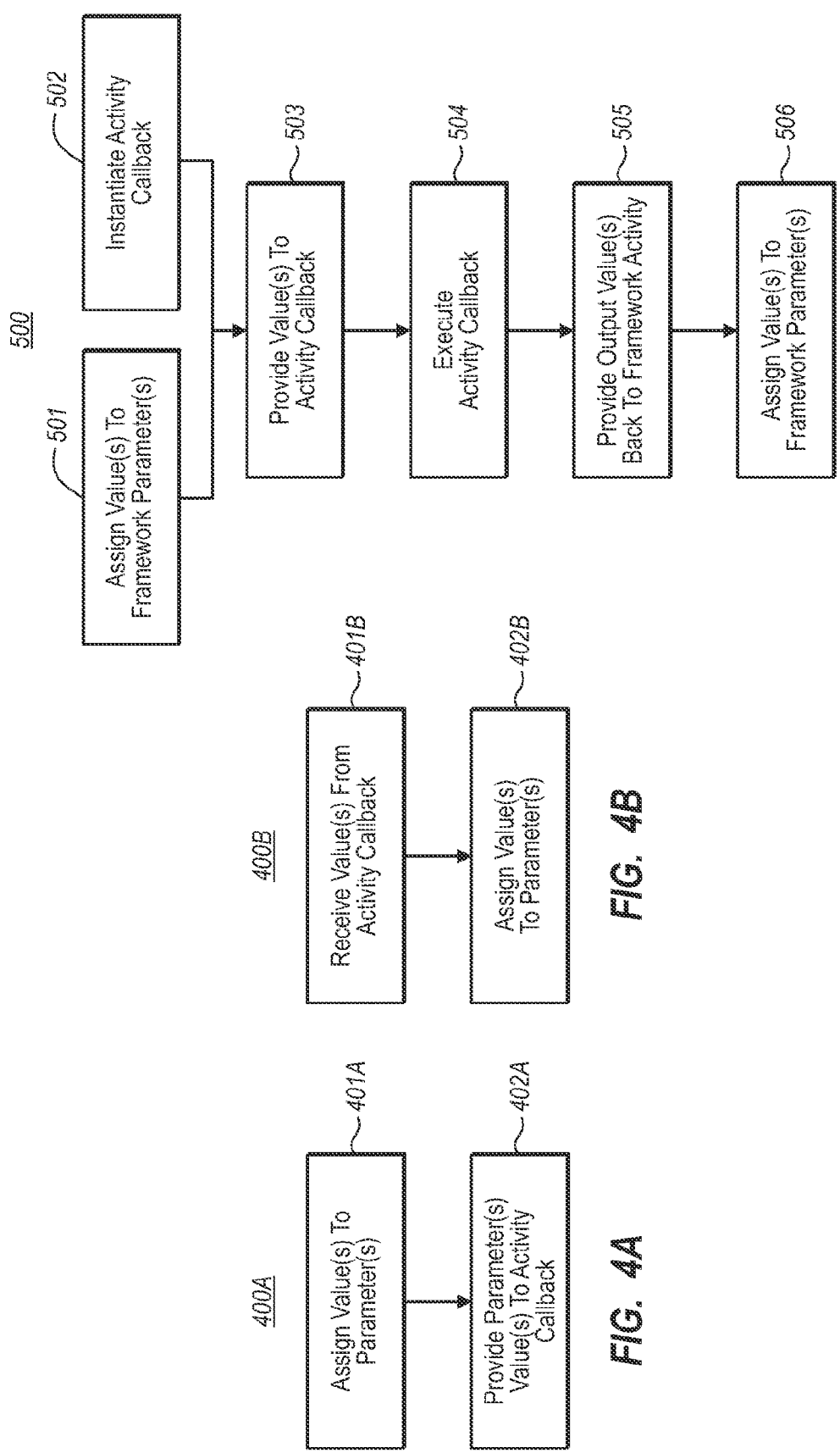

CONTINUATION-BASED RUNTIME CALLBACK INVOCATION

BACKGROUND

One type of software is referred to as a "runtime". A runtime provides underlying functionality that can be used by multiple applications that run on a computing system. One distinct type of runtime is called a "continuation-based runtime". A continuation-based runtime executes activities. An activity represents a unit of executable code that consists of multiple pulses of work. For instance, suppose an activity is to receive messages. In that case, one pulse of work might be to set up the computing system with proper configuration and state to receive messages, and then pause until a message is received. Another pulse of work might occur when a message is received, which might involve setting up the message so that data can be extracted from the message. Another pulse of work might be to extract the data from the message itself, and so forth. Between pulses the runtime may generate a continuation, allowing for an appropriate pause.

One of the ways an activity can execute multiple pulses of work is by scheduling subordinate, or "child", activities. Such composition of activities enables custom control flows that schedule child activities 0, 1 or n times as determined by the parent composite activity. Beyond this flexibility to create new control flows, activities in a continuation-based runtime have a number of distinct characteristics. For instance, such activities have no process affinity: they can be paused in one process, resumed in a different process, and may run on different threads. Such activities can also be persisted into persistent storage for later activation, or "rehydration", back into memory.

BRIEF SUMMARY

Although not required, some embodiments described herein relate to the invocation of activity callbacks in a continuation-based runtime. At framework-definition time, a framework activity is authored. The framework activity may have an environmental logic portion that processes input and/or output parameters whose values will be supplied to and/or received from an activity callback. The framework activity also includes a callback invocation portion that, during execution time, will actually provide parameter value(s) to and/or receive parameter value(s) from the activity callback.

The framework activity serves as a template that operates with any activity callback that has one or more characteristics. Such activity callbacks may not even be defined at framework-definition time. Instead, the framework activity may be used multiple times in the same applications, or in different applications to provide core framework functionality, while allowing application developers to plug in activity callbacks that meet the custom needs of the application.

Thus, although not required, continuation-based runtime applications may be authored in multiple phases, allowing subsequent developers to build upon the work of prior authors. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 4A illustrates a flowchart of a method for the framework activity to provide input environment processing in the case where input value(s) are to be provided from the framework activity to the activity callback;

FIG. 4B illustrates a flowchart of a method for the framework activity to provide output environment processing in the case where output value(s) are to be received from the activity callback to the framework activity;

FIG. 5 illustrates a flowchart of a method for executing the framework activity in conjunction with the activity callback.

DETAILED DESCRIPTION OF THE PREFERRED EMBODIMENTS

Embodiments described herein relate to activity callbacks in a continuation-based runtime. At framework-definition time, a framework activity is authored. The framework activity may have an environmental logic portion that processes input or output parameters whose values will be supplied to and/or received from an activity callback. The framework activity also includes a callback invocation portion that, during execution time, will actually provide parameter value(s) to and/or receive parameter value(s) from the activity callback. The framework activity serves as a framework that operates with any activity callback that has one or more characteristics (e.g., a certain name). First, some introductory discussion regarding a computing system in which the principles described herein may be employed will be described with respect to FIG. 1. Then, various embodiments of the configuration of various views on data models will be described with respect to FIGS. 2 through 6.

Figure 1:
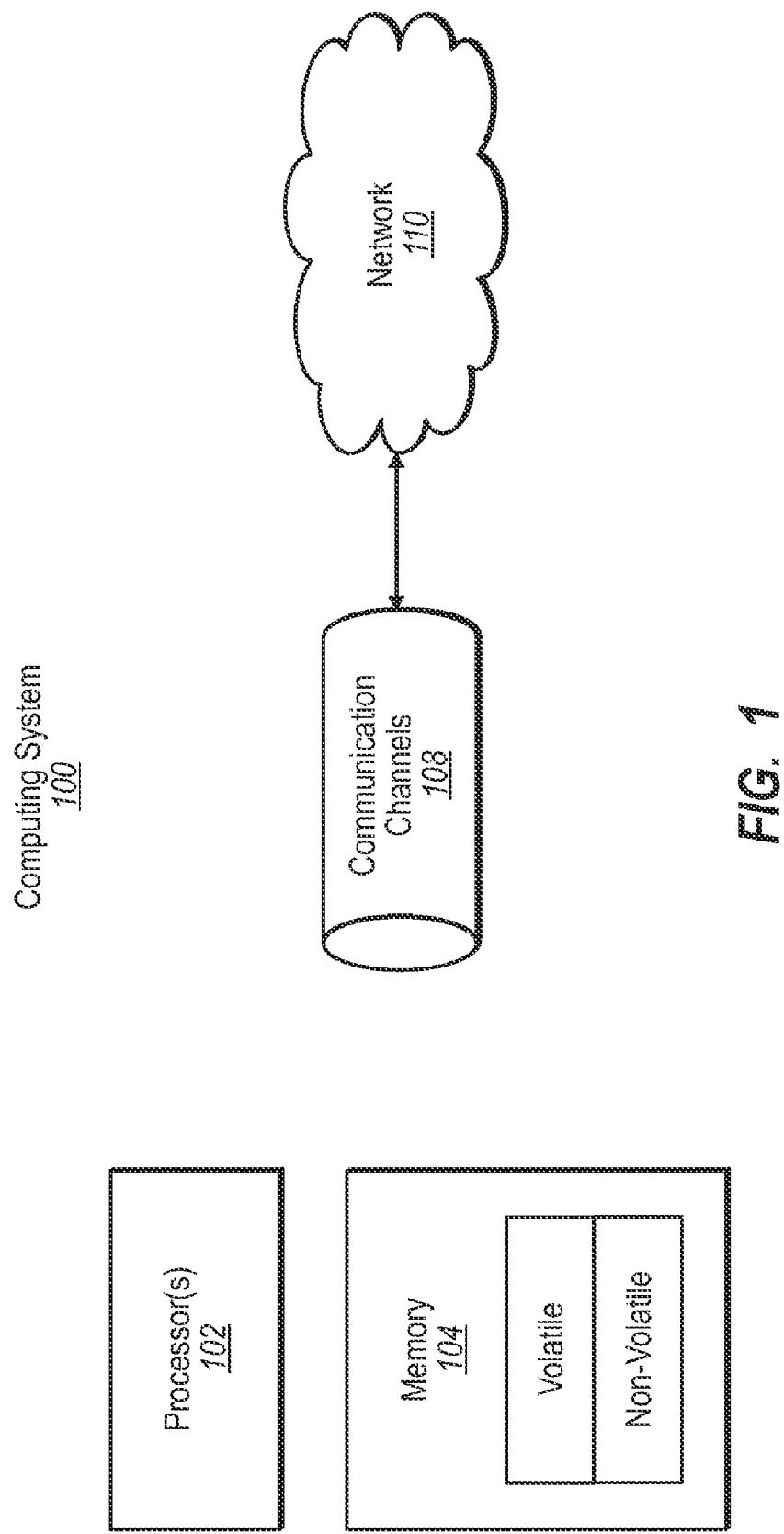
FIG. 1 illustrates a computing system in which embodiments described herein may operate.

FIG. 1 illustrates a computing system 100. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term "computer-readable media" as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
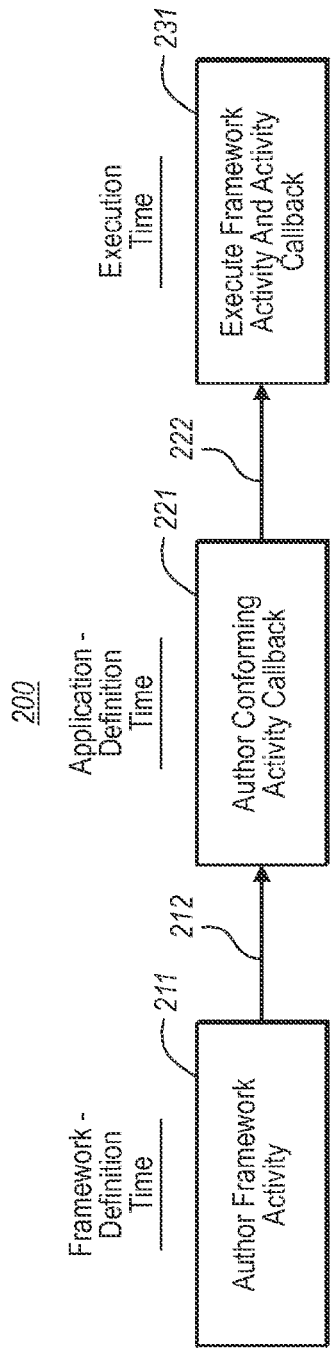
FIG. 2 illustrates a flowchart of a method for developing and executing a continuation-based runtime application.

FIG. 2 illustrates a flowchart of a method 200 for developing and executing a continuation-based runtime application. There are three distinct times associated with the process 1) framework-definition time, 2) application-definition time, and 3) execution time. The act(s) performed at framework-definition time are illustrated in the left column of FIG. 2 under the header "Framework-Definition Time". The act(s) performed at application-definition time are illustrated in the middle column of FIG. 2 under the header "Application-Definition Time". The act(s) performed at execution time are illustrated in the right column of FIG. 2 under the header "Execution Time".

At framework-definition time, a continuation-based runtime activity is authored (act 211) that will serve as a framework activity that future authors may use to add custom activity callbacks to. The form and function of the custom activity callbacks will depend on the nature of the application being developed. An activity callback is different than a typical subroutine in that the activity callback accepts and/or provides only the value of parameters, and not the entire parameter itself. In addition, the activity callback gets the value(s) through continuation-based expressions. However, at framework-definition time, the framework activity may be provided on one or more computer-readable media even though the activity callback that will be used in a completed application is not even present on the computer readable media. In this case, perhaps the activity callback has not even been predefined or even developed at this stage. The framework activity on the one or more computer-readable media may be perhaps just one of many framework activities provided as an overall framework product.

In this description and in the claims, a "framework" is defined as any set of computer-executable code that may be used and built upon by application developers in order to develop applications. A "framework" activity is defined as any continuation-based runtime activity that an application developer may later add an activity callback to in order to formulate an activity that operates as part of an application. This description will momentary divert to FIG. 3 prior to explaining the remaining features of FIG. 2.

Figure 3:
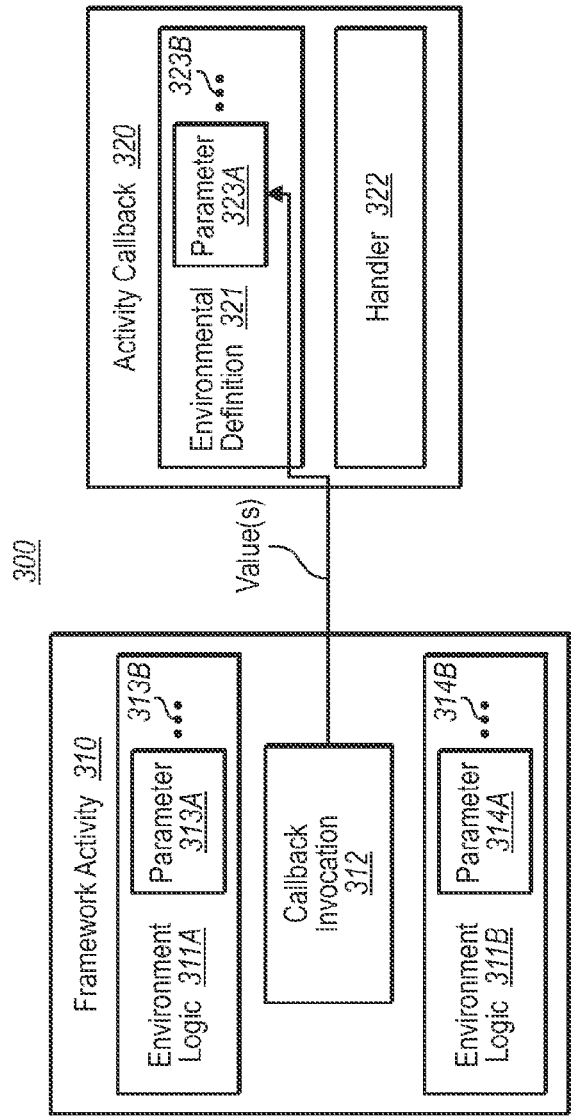
FIG. 3 schematically illustrates an environment that includes a continuation-based runtime framework activity in conjunction with an activity callback.

FIG. 3 schematically illustrates the environment 300 that includes a continuation-based runtime activity 310 (i.e., a "framework" activity) in conjunction with an activity callback 320. Since the discussion is still at the framework-definition time, this description will now focus exclusively on the framework activity 310, and will delay the substantive discussion of the activity callback 320 for subsequent description below.

The framework activity 310 includes environmental logic portion 311, which includes either or both of environmental logic portion 311A and 311B, referred to collectively as "environmental logic portion 311". The environmental logic portions 311 are structured such that, at execution time, if an activity callback is found that satisfies one or more criteria (e.g., that the activity callback has a particular name) or that has certain one or more characteristics, the environmental logic 311 performs environmental processing for that activity callback. Other examples of one or more criteria might include 1) input value compatibility, and 2) output value compatibility. For instance, if the activity framework provides two values, one of type string, and a second of type integer, the activity callback is authored to receive first a value of type string, and a second value of type integer. Likewise, if the activity framework expects to receive two values from the activity callback, the activity callback will be authored to provide values of the appropriate type and order. The parent activity might also restrict what the activity callback may call the parameters that the values are assigned to.

Which of the environmental logic 311A and/or 311B actual exist will depend ultimately the intended relationship with the activity callback. If one or more input value(s) are to be provided from the framework activity to the activity callback, environment logic 311A exists, and the framework activity 310 will perform the method 400A of FIG. 4A.

Referring to FIG. 4A, the environmental logic portion assigns a value to one or more parameters at execution time (act 401A). Referring to FIG. 3, for example, the environmental logic portion 311A assigns values to parameter 313A, amongst potentially other parameters as represented by the ellipses 313B. In order to assign a value to any given parameter, various processing might be performed depending on the intended function of the framework activity. Referring back to FIG. 4A, the callback invocation portion will then provide the values from one or more of these parameters to the activity callback (act 402A).

This value providing is performed without generally defining the provided value(s) as part of the general environment of the continuation-based runtime activity. Accordingly, the values are used specifically for the activity callback to process, and not for the general consumption of any child activity of the framework activity. Once again, this would be performed for any activity callback found at execution time that satisfies one or more criteria or that has one or more particular characteristics. Accordingly, an application developer may, at application-definition time, use the framework activity in combination with a custom activity callback to perform some custom function. The application developer need only ensure that the activity callback has the particular one or more characteristics.

If one or more input value(s) are to be received by the framework activity from the activity callback, environment logic 311B exists and the framework activity 310 will perform the method 400B of FIG. 4B.

Referring to FIG. 4B, the framework activity receive one or more value(s) from the activity callback (act 401B), and assigns the received values to one or more parameters at execution time (act 402B). Referring to FIG. 3, for example, the environmental logic portion 311B assigns values to parameter 314A, amongst potentially other parameters as represented by the ellipses 314B. The parameter values may then be further processed in accordance with the intended function of the framework activity.

In FIG. 3, the callback invocation portion 312 is structured to invoke any activity callback that is available and that has the particular one or more characteristics. For instance, perhaps an activity callback having a particular name is invoked, in which case the callback invocation portion 312 might specify that name. Furthermore, the callback invocation component might be structured to cause such an activity callback to be invoked and provide values to that activity callback and/or receive values from that activity callback.

Returning for a moment to FIG. 2, once the framework activity has been authored (act 211), the authored framework activity is provided in the form of a computer program product to an application developer (act 212). At application-definition time, an application developer may then author an activity callback that satisfies the one or more criteria (act 221). For instance, if the callback invocation specifies a name or identifier for the activity callback, an activity callback may be authored that has that designated name or identifier.

Returning to FIG. 3, the environment 300 includes not only the framework activity 310, but also includes an activity callback 320. At framework-definition time, the activity callback 320 is not yet authored, but can be reused for any of a variety of activity callbacks that have the particular one or more characteristics. At application-definition time, however, an application developer 320 has defined a particular activity callback illustrated as activity callback 320. The framework activity 310 can be reused for any activity callback in this or any other continuation-based runtime application.

The activity callback 320 includes an environmental definition portion 321 that receives the one or more provided value(s) from the callback invocation portion 312, and assigns the provided value(s) to one or more callback parameter(s). For instance, value(s) may be provided to parameter 323A (and potentially other parameters as represented by the ellipses 323B). The identity of which values provided by the framework activity go into which callback parameters may be predetermined. For instance, the placement may be defined by the order in which the values are provided by the callback invocation 312, and the order of the parameters 323A, 323B in the environmental definition 321. The predefined nature of this assignment permits activity callback authors to be able to properly draft their activity callbacks such that the proper values are deterministically known to populate the proper parameters.

The activity callback 320 also includes a handler 322 that includes logic for processing the one or more callback parameter(s). Although the term "activity callback" includes the modifier "activity", the activity callback 320 itself need not be an activity. Perhaps the callback invocation 312 is, however, a child activity of the framework activity 310, and perhaps the handler 322 is a continuation-based runtime activity. In that context, an activity callback may be viewed as a collection of the handler activity in conjunction with the environmental definition portion that marshals values from the callback invocation into appropriate parameters that the handler activity will use as part of its environment.

Returning to FIG. 2, after application-definition time, the authored application, which now includes the framework activity and the activity callback, are provided to the user in the form of a computer program product (act 222).

At execution time, the user may then execute the framework activity authored at framework-definition time (act 231), thereby executing the activity callback authored at application-definition time. FIG. 5 illustrates a flowchart of a method 500 for executing the framework activity in conjunction with the activity callback.

As the framework activity executes, if the environmental logic portion 311A is present, one or more value(s) are assigned to one or more parameter(s) at execution-time (act 501). When the callback invocation is encountered, the activity callback is instantiated (act 502). For instance, when the callback invocation is encountered, an activity callback having the particular one or more characteristics is found. If, for example, the callback invocation specified a name for the activity callback, the activity callback with that name is found.

The value(s) from the framework parameters are then provided specifically to the activity callback (act 503), without generally defining the provided value(s) as part of the general environment of the framework activity. The instantiated activity callback is then executed (act 504) such that the instantiated callback may operate using the provided value(s).

If the activity callback provides one or more output values, the environmental logic portion 311B is configured to receive the one or more provided values (act 505), and assign the received value(s) to one or more framework parameter(s) (act 506).

Figure 6:
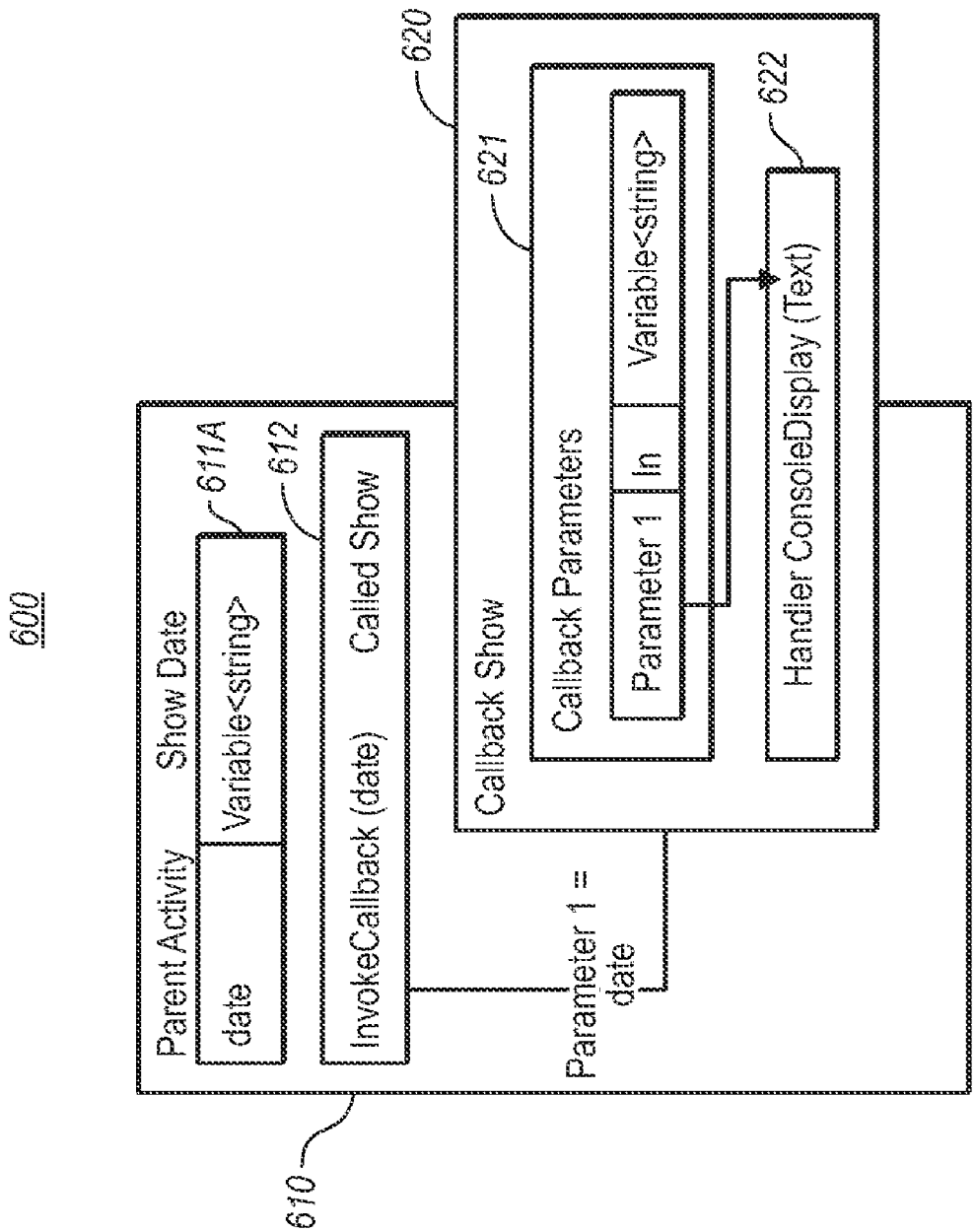
FIG. 6 schematically illustrates an example framework application called "ShowDate" in conjunction with an example activity callback called "Show".

FIG. 6 illustrates an example 600 of a framework activity 610 in conjunction with an activity callback 620. In this case, the framework activity 610 is called "Show Date" and operates to provide a string value to any activity callback called "Show". The environmental logic portion 611A declares a parameter called "date" as a string. The environmental logic portion 611A will also assign a string value to that Date parameter. The callback invocation portion 612 includes a method called in this example "InvokeCallback" which lists "date" as a parameter, and which also at least implicitly represents that an activity callback called "Show" is to be executed.

Accordingly, the Show activity callback 620 is executed. The framework activity does not necessarily pass the entire Date parameter to the Show activity callback, but does provide the value of the Date parameter (which in this case is a string value) to the Show activity callback. From the framework activity perspective, any activity callback that has a name of "Show" will suffice for the activity callback. The framework activity will provide the string representing the date to any such activity callback, and the framework activity need not enforce any criteria for what the activity callback does with that date. In this case, the environmental definition portion 621 of the Show activity callback assigns the string to an input parameter called "Parameter1". The handler 622 may be an activity that uses Parameter 1 as a component of its environment.

Accordingly, the principles described herein provide a flexible mechanism for composing a framework activity in a continuation-based runtime. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A physical storage device having stored thereon a representation of a continuation-based runtime activity that includes:
   an environmental logic portion that is structured to assign each of plurality of values to a corresponding parameter of a plurality of parameters at execution time of the continuation-based runtime activity; and
   a callback invocation portion that is structured to invoke one or more activity callbacks that 1) are available for use with the continuation-based runtime activity and that 2) each have one or more characteristics that are used to identify the one or more activity callbacks, wherein the callback invocation portion is structured to cause the following to be performed at execution time of the continuation-based runtime activity for each activity callback that is available at execution time and that has the one or more characteristics:
   an act of instantiating the activity callback;
   an act of providing the plurality of values from plurality of parameters specifically to the instantiated activity callback, the plurality of values being provided in a particular order while refraining from specifying which parameter each provided value is assigned to; and
   an act of executing the instantiated activity callback, such that the instantiated callback may operate using the provided plurality of values, the instantiated activity callback being configured to identify which of the plurality of parameters each provided value is assigned to, based on the particular order in which the plurality of values were provided.

2. The physical storage device in accordance with claim 1, wherein the one or more characteristics comprises that the activity callback has a name having a particular value.

3. The physical storage device in accordance with claim 1, wherein the activity callback itself does not exist on the physical storage device, although the continuation-based runtime activity does exist on the physical storage device.

4. The physical storage device in accordance with claim 3, wherein an identity of the activity callback is not predefined even though one or more characteristics are required of the activity callback.

5. The physical storage device in accordance with claim 3, wherein a structure of the activity callback is not predefined even though one or more characteristics are required of the activity callback.

6. The physical storage device in accordance with claim 1, wherein the physical storage device further has stored thereon an activity callback that satisfies has the one or more characteristics.

7. The physical storage device in accordance with claim 6, wherein the activity callback comprises:
   an environmental definition portion that receives the one or more provided value(s) from the callback invocation portion, and assigns the provided value(s) to one or more callback parameter(s); and
   a handler that includes logic for processing the one or more callback parameter(s).

8. The physical storage device in accordance with claim 7, wherein the handler is also a continuation-based runtime activity.

9. The physical storage device in accordance with claim 1, wherein the environmental logic portion is further structured such that if an activity callback is available at runtime that has the one or more characteristics, and the activity callback provides one or more output value(s), the environmental logic portion is configured to receive the one or more provided values, and assign the received value(s) to one or more parameter(s).

10. A physical storage device having stored thereon a representation of a continuation-based runtime activity that includes:
    an environmental logic portion; and
    a callback invocation portion that is structured to invoke one or more activity callbacks that 1) are available for use with the continuation-based runtime activity and that 2) each have one or more characteristics that are used to identify the one or more activity callbacks, wherein the callback invocation portion is structured to cause the following to be performed at execution time of the continuation-based runtime activity for each activity callback that is available at execution time and that has the one or more characteristics:
    an act of instantiating the activity callback;
    an act of executing the instantiated activity callback; and
    an act of receiving a plurality of values from the activity callback, the plurality of values being received in a particular order without specification a parameter that each provided value is to be assigned to;
    wherein the environmental logic portion is structured to assign each of the received plurality of values from the activity callback to a corresponding parameter of a plurality of parameters at execution time, the environmental logic portion being structured to determine which parameter of the plurality of parameters to assign each value of the plurality of values to based on the particular order in which the plurality of values were received from the activity callback.

11. The physical storage device in accordance with claim 10, wherein the one or more characteristics comprises that the activity callback has a name having a particular value.

12. The physical storage device in accordance with claim 10, wherein the activity callback itself does not exist on the physical storage device, although the continuation-based runtime activity does exist on the physical storage device.

13. A method, implemented at a computer system that includes one or more processors, for executing a continuation-based runtime activity, the method comprising:

an act of the computer system executing a continuation-based runtime activity, the continuation-based runtime activity including an environmental logic portion and a callback invocation portion that were defined at a framework definition time, the environmental logic portion being structured such that, when an activity callback is found at runtime of the continuation-based runtime activity that satisfies one or more criteria, the environment logic portion is configured to, at execution time of the continuation-based runtime activity, perform the following:

A) if a plurality of values are to be provided to the activity callback, 1) assign each value to a corresponding parameter of a plurality of parameters at execution time, and 2) provide the plurality of values from the plurality parameters specifically to the activity callback, the plurality of values being provided in a particular order while refraining from specifying which parameter each provided value is assigned to;

B) if a plurality of values are to be received from the activity callback, 1) receive the plurality of values from the activity callback in a particular order, and 2) assign each of the received plurality of values from the activity callback to a corresponding parameter of the plurality of parameters based on the particular order.

14. A method in accordance with claim 13, further comprising:

an act of accessing the continuation-based runtime activity from a computer storage media.

15. A method in accordance with claim 13, wherein the activity callback is defined at an application-definition time.

16. A method in accordance with claim 13, wherein the act of executing the continuation-based runtime activity comprises:

an act of instantiating the activity callback; and
an act of executing the instantiated activity callback.

* * * * *